Nov. 19, 1968

J. S. PAGE, JR 3,411,585

SURFACE CONTROL OF SUB-SURFACE WELL VALVING
USING FLOW PASSING TUBING LINK

Filed April 28, 1966

INVENTOR
JOHN S. PAGE, JR.
By White & Haefliger
ATTORNEYS.

Nov. 19, 1968

J. S. PAGE, JR 3,411,585

SURFACE CONTROL OF SUB-SURFACE WELL VALVING USING FLOW PASSING TUBING LINK

Filed April 28, 1966

INVENTOR.
JOHN S. PAGE, JR.
BY White & Haefliger
ATTORNEYS.

Nov. 19, 1968  J. S. PAGE, JR  3,411,585
SURFACE CONTROL OF SUB-SURFACE WELL VALVING
USING FLOW PASSING TUBING LINK
Filed April 28, 1966  8 Sheets-Sheet 3

INVENTOR.
JOHN S. PAGE, JR.
BY White & Haefliger
ATTORNEYS.

Nov. 19, 1968 J. S. PAGE, JR 3,411,585
SURFACE CONTROL OF SUB-SURFACE WELL VALVING
USING FLOW PASSING TUBING LINK
Filed April 28, 1966 8 Sheets-Sheet 4

INVENTOR.
JOHN S. PAGE, JR.
By White & Haefliger
ATTORNEYS.

INVENTOR.
JOHN S. PAGE, JR.
By White & Haefliger
ATTORNEYS.

INVENTOR.
JOHN S. PAGE, JR.
By White & Haefliger
ATTORNEYS.

United States Patent Office 3,411,585
Patented Nov. 19, 1968

3,411,585
SURFACE CONTROL OF SUB-SURFACE WELL VALVING USING FLOW PASSING TUBING LINK
John S. Page, Jr., 3260 Val Verde Ave., Long Beach, Calif. 90808
Filed Apr. 28, 1966, Ser. No. 546,054
22 Claims. (Cl. 166—73)

ABSTRACT OF THE DISCLOSURE

The disclosed invention concerns a sub-surface well valve that is mechanically operable by vertical movement of flow tubing carrying the valve and actuated at the surface, the valve in open position providing a vertically uninterrupted flow passage through the flow tubing, and the valve being upwardly retrievable through the installed flow tubing for seal replacement.

---

This invention relates generally to surface operation of sub-surface valves, and more particularly concerns mechanically operated sub-surface valves.

In the past, most safety valves for oil wells have been actuated from the surface by control of hydraulic pressure communicated to the sub-surface valve via a hydraulic control line. This method presents problems having to do with making proper connections of the control line, and with maintaining such connections pressure tight. As an alternative, certain proposals for mechanical operation of a sub-surface valve from the surface, as by a rod string suffer from disadvantages including inability of such a string to pass well tools such as pressure bombs and perforating guns, and also the lack of provision for sufficiently reliable fail-safe operation as in the event of shearing of the string in off-shore environment.

The present invention has an important objects the overcoming of the above disadvantages through the provision of unusually effective equipment operable to control a sub-surface oil well valve. Basically, the invention contemplates the use of structure including a well fluid flow-controlling valve adapted for installation and operation at a sub-surface location in a well, and apparatus including a vertically reciprocable pressure responsive actuator adapted for installation and operation at the well head, these being combinable with means including flow tubing adapted for installation and operation in the well and connected to be vertically displaced by the actuator for effecting displacement of the valve between open position in which well fluid is flowable vertically upwardly through the valve, tubing and actuator to the well head, and closed position in which the valve structure blocks upward flow to the well head. Typically, the tubing has a central flow passage which remains vertically open through the valve structure and actuator when the valve is in open position. As a result, well tools, as for example pressure bombs or tubing perforating guns may be run through the valve to the bottom of the well, without removing anything from the well and in spite of the fact that valve operating displacement is transmitted mechanically down the hole to the valve. Also, the invention affords a straight-through flow pattern, giving a minimum pressure drop through the valve and associated operating equipment.

Another unusually effective feature and advantage of the invention includes the provision of a chamber to receive the actuator at the well head and mean to apply fluid pressure to the actuator in the chamber so as to displace the actuator and tubing vertically, such means typically comprising a pilot valve to selectively communicate well pressure to opposite sides of the tubing. This, together with appropriate venting of the non-pressurized side of the actuator and provision for closure of the subsurface valve upon down stroking of the tubing affords a fail-safe feature, in that if the surface piping or pilot valve were destroyed or developed substantial leakage, both sides of the actuator piston would be vented to atmosphere, allowing the weight of the valve operating tubing to fall and effect closing of the valve.

Additional and important objects and advantages of the invention include the provision of a valve having a plug which in open position extends, or is trapped, eccentrically with respect to the flow tubing axis; the provision of outer tubing adapted for installation in the well to extend below the surface actuator chamber and to receive the flow tubing proximate the valve, the outer tubing containing a side opening to receive the valve upon opening thereof; the provision of a tubular insert having a side opening movable vertically with the flow tubing and in such relation to the outer tubing side opening as to pass the valve upon moving thereof between open and closed position; the provision of a collet supporting such an insert within the flow tubing. The collet being releasable and the insert and collet being sized for upward retrieval through the flow tubing upon release of the collet; the provision for communication of well pressure via the flow tubing and outer tubing to the actuator and tending to urge the actuator in a direction acting to close the sub-surface valve; and the provision for packing off between the outer tubing the flow tubing above the subsurface valve, but below the actuator, as will be described, and enabling elimination of most of the outer tubing.

These and other objects and advantages of the invention, as well as the details of illustrative embodiments, will be more fully understood from the following detailed description of the drawings, in which:

FIGS. 4 through 4d are enlarged vertical elevations taken in section and showing a modified surface actuator and sub-surface valving, the latter being open;

FIGS. 6 and 7 are horizontal sections taken on lines 6—6 and 7—7 of FIG. 2a;

FIG. 8 is a horizontal section taken on line 8—8 of FIG. 4a;

Figure 1:
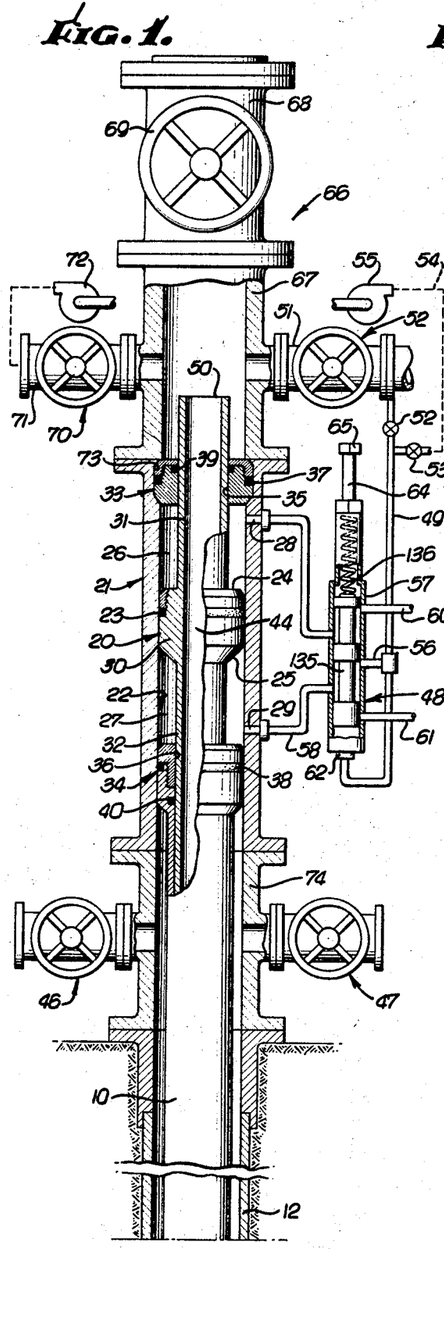
FIGS. 1, 1a and 1b are vertical elevations taken in section showing one preferred form of the invention as installed in a well.
Figure 1A:
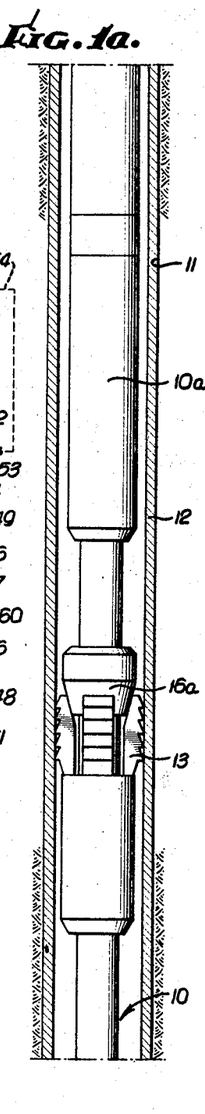
Figure 1B:
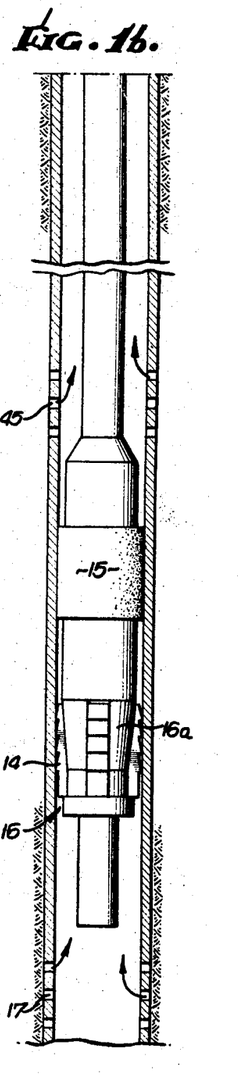

Referring first to FIGS. 1, 1a and 1b, a well fluid flow controlling valve will be understood as contained within the tubing section or body 10a, the latter being installed at a sub-surface location in a well 11 cased at 12. The body 10a is connected in the outer tubing string 10 which is supported by upper and lower slips 13 and 14 set to engage the casing. A packer 15 is also set to engage the casing bore, packing off the connection between that bore and the string 10. Suitable structure supporting the packer and slips is generally indicated at 16, that structure including tapered bodies or cones 16a for cooperating with the slips. Production may enter that lower terminal of the string 10, as from casing perforations 17, to flow upwardly within the string when the sub-surface valve is open, as will be described. Production fluid entering the casing annulus at 45 above packer 15 may flow upwardly for removal at the well head via valve controlled connections 46 and 47.

FIG. 1 illustrates one form of apparatus including a vertically reciprocable pressure responsive actuator adapted for installation and operation at the well head. As there shown, the tubular actuator 20 is contained within a chamber 21 having a vertical bore 22 with which the actuator piston 30 has sliding and sealing contact as at 23. Upper and lower actuator piston surfaces 24 and 25 are adapted to receive fluid pressure applied to the chamber zones 26 and 27 via inlets 28 and 29, respectively. Chamber 21 is large enough to allow the main tubing string 10 and the bottom hole packer 15 as well as slips 13 and 14 to be installed and retrieved through it.

The actuator 20 may also be considered to include upper and lower tubular plungers 31 and 32, integral with tubular piston 30, and extending telescopically through upper and lower chamber members 33 and 34 respectively, those members reduced bores 35 and 36 are closely receiving the respective plungers. In this regard, member 34 may be carried at the upper terminal of tubing string 10, the members seal off at 37 and 38 against chamber bore 22, and the members seal off at 39 and 40 against the plungers.

The invention contemplates the provision of means including flow tubing adapted for installation and operation in the well and connected to be vertically displaced by the actuator for effecting displacement of the sub-surface flow control valve between open piston in which well production fluid is flowable vertically upwardly through the valve, tubing and actuator and to the well head, and closed position in which the valve structure blocks upward flow to the well head. As one example of this, the lower plunger 32 has integral connection with flow or inner tubing 41 better seen in FIG. 2 as extending vertically within the outer string 10. In this regard, the flow tubing has a central flow passage 42 which remains vertically open through the actuator vertical passage 44 and sub-surface valve structure when the latter is in open position, as for example is illustrated in FIGS. 1 and 2a.

Also contemplated is the provision of means to supply fluid pressure to the actuator 20, so as to displace it and inner or flow tubing 41 vertically. Such means may typically include pilot valving indicated generally at 48 as connected to receive well fluid pressure via line 49 and to selectively communicate such pressure to the opposite sides, or piston surfaces 24 and 25, of the actuator piston. For example, production flowing up through the upper terminal 50 of the actuator and taken off via line 51, valve controlled at 52, may be pressure tapped via line 49 by opening valve 52 therein. At the same time, valve 53 in auxiliary pressure supply line 54 may be closed, a pump 55 connected to that line being usable when desired to supply pressure to line 49, with valve 53 open and valve 52 closed.

Pressure in line 49 passes via inlet 56 to the pilot valve housing 57, wherein its flow to piston surface 24 or 25 is selectively controlled. For example, when pressure is supplied to piston surface 25 via line 58 and port 29, pressure at surface 24 is vented via port 28, line 59, the pilot valve 48 and vent 60, and the actuator is lifted to elevate the inner tubing 41 and thereby operate the sub-surface valve, say to open position. If well pressure fails, the weight of the tubing 41 and actuator will overcome the reduced well pressure exerted on surface 25, and the tubing will drop to close the sub-surface valve, providing a fail-safe feature. Alternatively, when pressure is supplied to piston surface 24, the pilot valve vents the pressure at surface 25 via port 29, line 58, the pilot valve chamber and the vent 61.

The pilot valve may be operated by pressure in line 49 applied to chamber inlet 62, thereby to urge a control plunger 135 upwardly against the resistance of an internal spring 136 to effect pressure application to piston surface 25 and venting of pressure at surface 24. To adjust the pilot valve, a control screw 64 may be turned at head 65, thereby to effect increased or decreased pressure application to the spring. If the screw is turned sufficiently, the plunger 35 drops to apply pressure to upper zone 26 and vent zone 27.

To complete the description of FIG. 1, the tree 66 may include a large diameter pipe section 67 mounting the top pipe section 68 containing a valve 69 openable to run tools such as perforating guns and pressure bomb into and out of the well via the passage 44 in the actuator, the passage 42 in inner tubing 41, and open subsurface valve to be described. If it is desired to pressurize down through these passages, valves 52 and 69 may be closed, valve 70 in auxiliary line 71 may be open, and pump 72 operated. Note that pipe section 67 retains the member 33 in the enlarged counterbore 73 of chamber 21. That chamber is supported by pipe section 74 below which the casing 12 extends, and to which lines 46 and 47 are connected.

Figure 2:
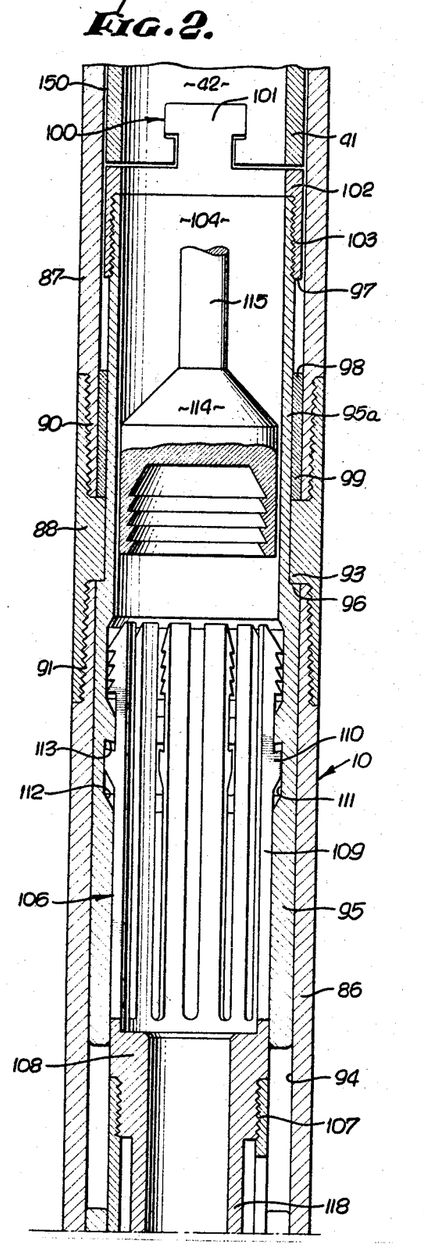
FIGS. 2 and 2a are enlarged vertical sectional elevations showing one preferred form of sub-surface valve in open position.
Figure 2A:
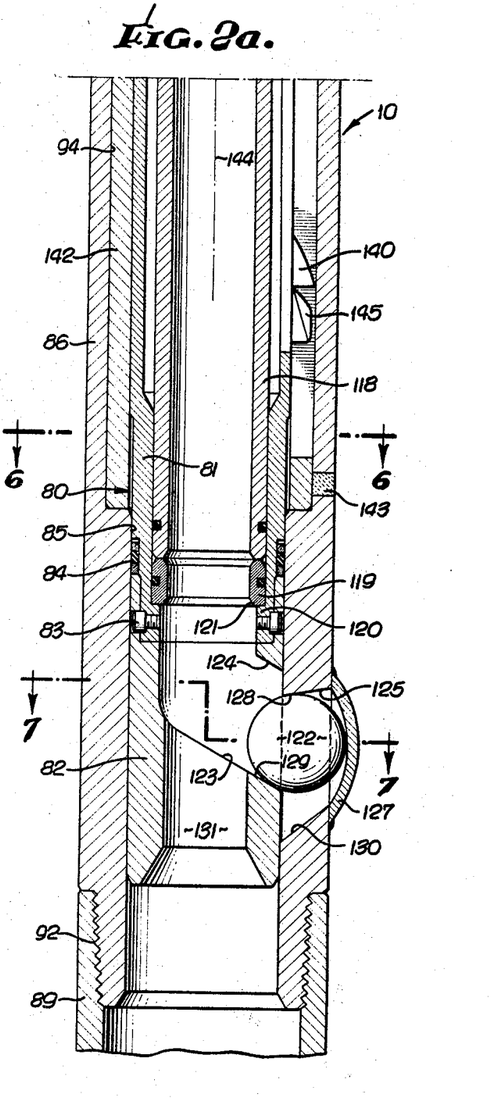
Figure 3:
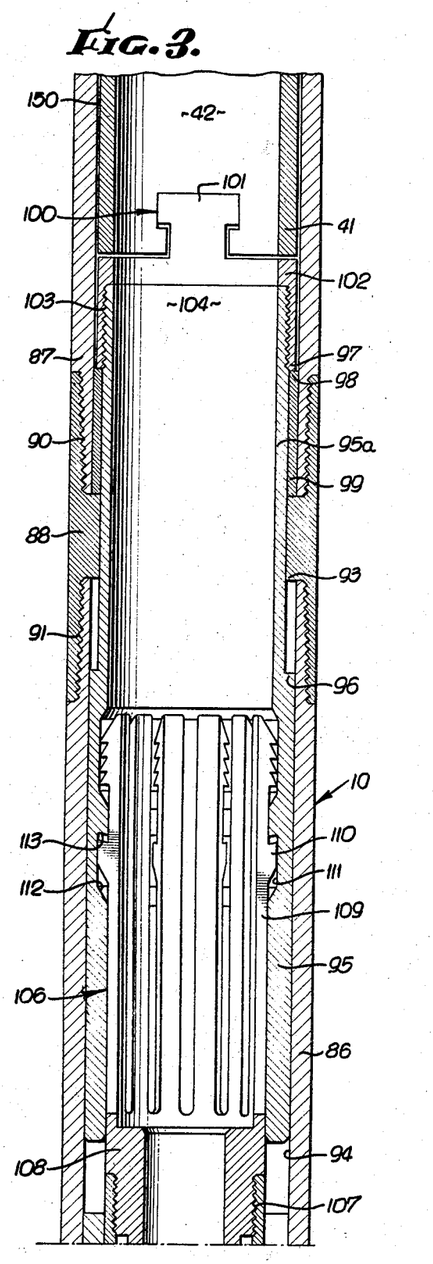
FIGS. 3 and 3a are views similar to FIGS. 2 and 2a, but showing the valve in closed position.

Turning now to FIGS. 2 and 2a, the sub-surface structure includes a tubular insert 80 having sections 81 and 82 connected at 83, there being a sandwich seal 84 retained between those sections for sealing off against the bore 85 of section 86 of outer tubing 10. The latter also may include sections 87, 88 and 89 as shown, and with threaded interconnection at 90, 91 and 92. Section 88 is internally flanged at 93 and section 86 counterbored at 94, thereby to receive a sleeve portion 95 of the inner tubing 41, that sleeve portion being engageable with the flange 93 at 96 to limit upward stroking of the inner or flow tubing 41 and the actuator relative to the outer tubing 10. Downward stroking of the actuator and inner tubing is limited by engagement of the shoulder 97 thereof with the shoulder 98 on spacer sleeve 99 which is mounted on flange 93, and through which the sleeve portion 95a of the inner tubing is telescopically received, as seen in FIG. 3. Sleeve portion 95a has a loose connection with the main extent of the inner tubing 41 extending thereabove, in order to prevent binding of the lower portions 95 and 95a during their vertical displacement in outer tubing 10. Such a loose connection is for example afforded by the tongue and groove connection seen at 100, the tongues 101 carried by the cap 102 threaded at 103 on the upper terminal of sleeve portion 95a. In this regard, while well fluid pressure thereby has access to the space 150 between the inner and outer strings, that pressure is blocked by seal 40 from access to the actuator piston 30. Passage 104 within portions 95 and 95a is as large as passage 42 in inner tubing 41, to permit retrieval of insert 80, as will be described.

The insert 80 has releasable connection with the sleeve portion 95 as by means of a collet 106 mounted on the insert, the insert section 81 for example being thread connected at 107 to the collet ring 108. The collet has upwardly extending spring fingers 109 urged outwardly to retain lugs 110 in an annular groove 111 formed in section 95. Groove shoulder 112 is angled to urge the latches and spring fingers inwardly when a retrieving tool 114 is lowered as by wire line 115 to engage the upper serrated terminals 116 of the spring fingers, for retrieving the insert and valve to be described. Groove shoulder 113 blocks upward movement of the collet and insert, when the lugs 110 are in groove 111.

The collet has a lower tubular extension 118 projecting downwardly within insert section 81 to retain an annular seat ring 119 in position above shoulder 120, as seen in FIG. 2a. Both the seal and extension carry annular seals to seal off against the bore of extension 81. The ring 119 has an annular seat 121 facing downwardly to receive a valve stopper in the form of a ball 122, as better seen in FIG. 3a. In this regard, the insert section 82 has a ramp 123 angled to guide the ball to drop laterally outwardly toward open position as seen in FIG. 2a, and via a side opening 124 in the insert section 82.

Figure 3A:
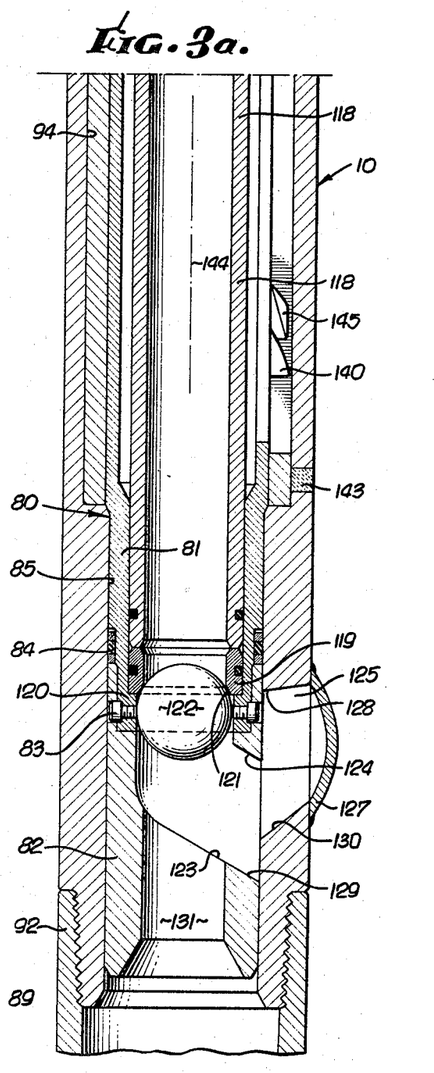

Generally speaking, side opening 124 is movable vertically by the flow tubing 41 and in such relation with a side opening 125 in the outer tubing as to pass the valve upon movement thereof between open and closed positions. Thus, in FIG. 2a, the ball 122 is trapped in the side opening or pocket 125, exteriorly capped at 127, by the oppositely tapering shoulders 128 and 129 of the respective openings 125 and 124. In this position, the valve is open and the well is in flowing condition. When the surface operator permits the linkage including inner tubing 41 to drop, the ball 122 is allowed to roll down ramp 130 angled to guide the ball laterally inwardly toward insert side opening 124, as for example when shoulder 129 drops slightly below the lower edge of ramp 130. The ball thus rolls into the upward flow stream through passage 131, which displaces the ball upwardly toward and against the seat 121, closing the valve as seen in FIG. 3a. Such closing occurs automatically when the pilot valve 48 senses a drop in well pressure to a predetermined reduced level, since the pilot valve plunger or spool 135 in FIG. 1 will then be displaced downwardly by the spring 136 to effect venting of pressure at the bottom side of the actuator piston 30. If the piping 49 between the flow line 51 and the operator, including the pilot valve 48, were to be torn away or destroyed, both sides of the piston 30 would be vented to atmosphere, allowing the linkage including inner tubing 41 to drop by its own weight, thereby to close the sub-surface safety valve.

To open the valve, fluid pressure is introduced as by pump 72 downwardly through the actuator and tubing 41 to displace the valve ball 122 downwardly against the ramp 123 in FIG. 3a. Such pressure is also communicated via lines 51 and 49 to the pilot valve, displacing the spool 135 upwardly against spring 136, thereby to effect pressure application to the underside of the actuator piston 30, lifting the inner tubing and trapping the ball 122 in FIG. 3a position, the ball having moved down ramp 123 and into the registered side openings 124 and 125.

FIGS. 2 and 2a show a pilot or guide sleeve 142 received in counterbore 94 in outer tubing section 95. Sleeve 142 is anchored in position at 143, and has a guide shoulder 140 spiraling about the assembly axis 144. An inwardly collapsible but outwardly urged spring finger 145 carried on the collet engages the shoulder 140 to rotate and guide the collet and insert as the latter is landed downwardly in the outer tubing, thereby to bring side opening 124 in the insert into position for registration with side opening 125 in the outer tubing, FIG. 3 shows the engagement of shoulders 97 and 98 at the downward limit of displacement of inner tubing 41 with respect to the outer tubing 10.

Turning now to the modified form of the invention as seen in FIGS. 4, 4a, 5 and 8, the same basic elements are present as were previously described above. Thus, a tubular actuator 160 at the well surface includes a piston 161 sealably movable vertically within bore 162 of cylindrical chamber 163. Tubular actuator plunger 164 is telescopically movable in chamber member 165 and sealed off at 166. Thus a sealed zone 167 is formed above the piston and ported at 168.

Tubular actuator lower extension 169 is spaced from the chamber member 170 that seals against bore 162 at 171, whereby well pressure may flow upwardly in that space 172 to exert upward force on the piston tending to urge the actuator toward elevated position for closing the sub-surface valve. Well fluid gains access to space 172 via a tongue and groove connection (not shown) similar to that at 100 in FIG. 2, for connecting the inner tubing 173 with inner sleeve portion 174 corresponding with portion 95 and 95a in FIG. 2. The outer tubing receiving the inner tubing is indicated at 184 and as having connection at 175 with member 170. The well casing appears at 176.

Figure 4:
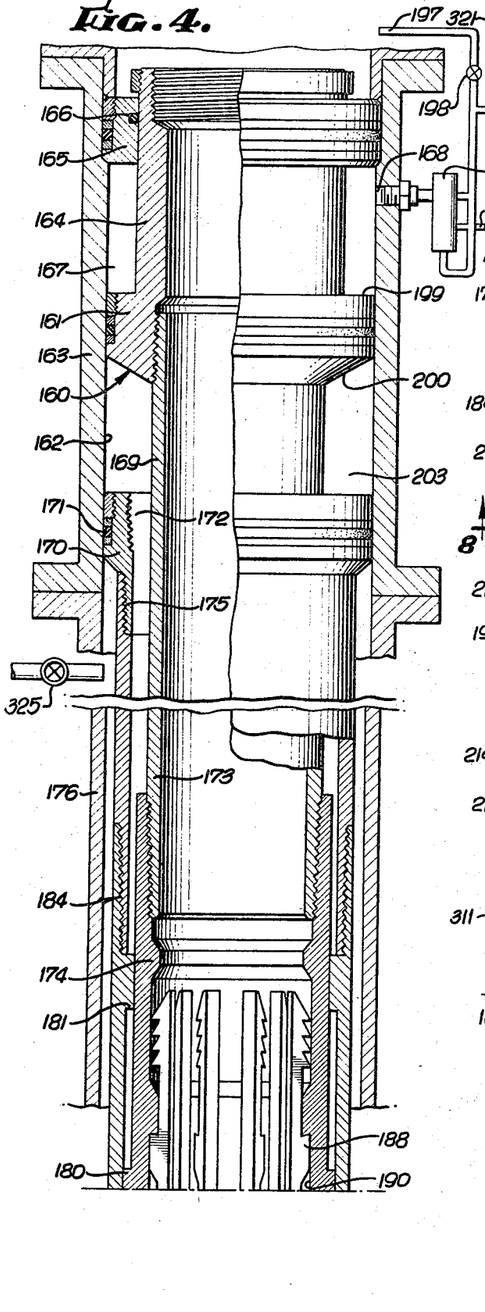
Figure 4A:
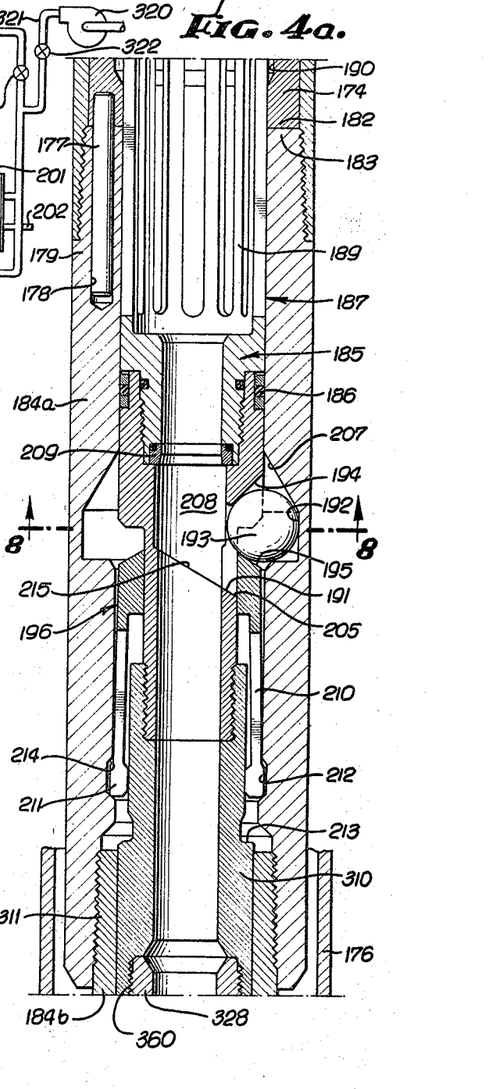

Referring to FIG. 4a, a vertical pin 177 carried by sleeve portion 174 is receivable in a guide passage 178 formed in outer tubing section 179 to guide vertical stroking of the portion 174 between an upper limit established by engagement of shoulders 180 and 181, and a lower limit established by engagement of shoulders 182 and 183.

A tubular insert 185 is received within the outer tubing section 184a, the clearance therebetween being packed off at 186. A collet 187 supports the insert, as by reception of lugs 188 on spring fingers 189 into annular groove 190 in the sleeve portion 174. As before, the spring fingers have serrated upper terminals tapered for inward collapse and retention by a retrieving tool, acting to unlatch the lugs 188 from the groove 190.

Figure 5:
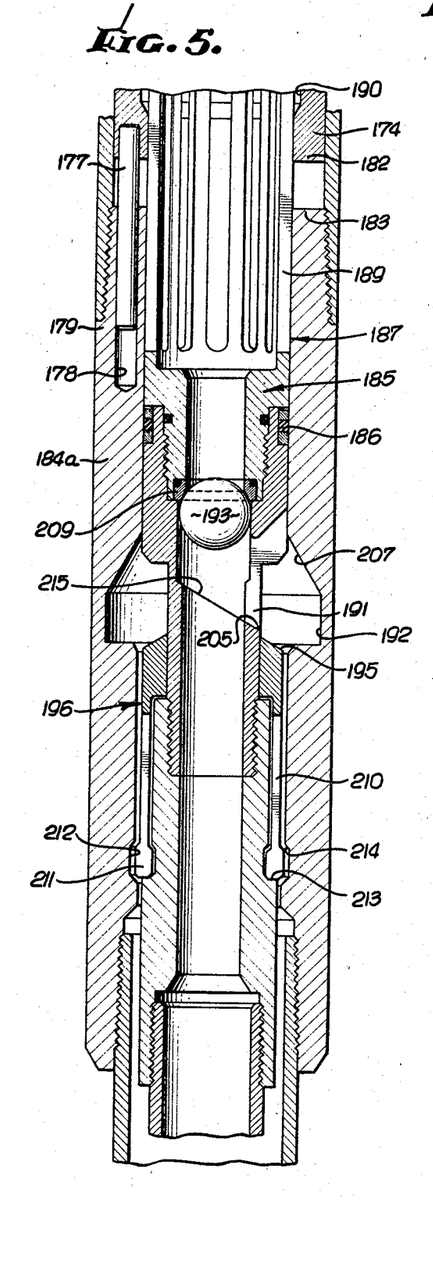
FIG. 5 is a view like FIG. 4a but showing the modified valve in closed position.
Figure 6:
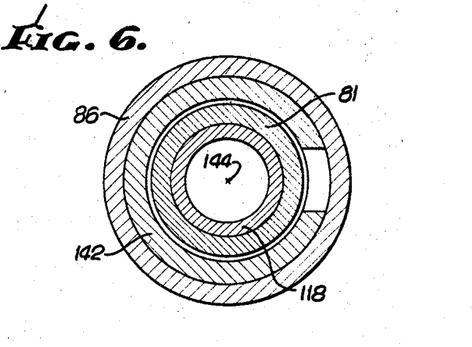
Figure 7:
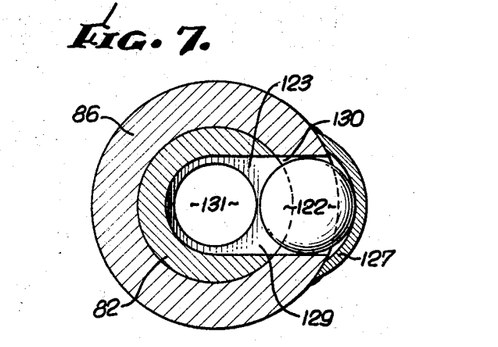
Figure 8:
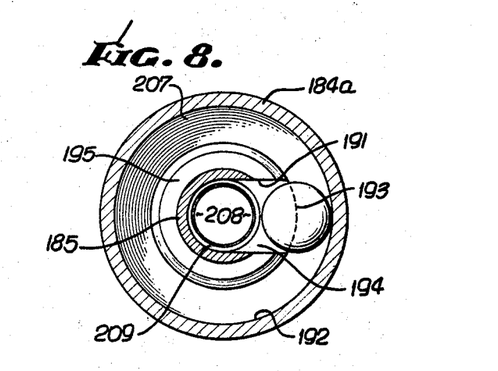

Generally speaking, a side opening 191 in the insert is movable vertically by the insert, collet and inner tubing 173 and in such relation with a side opening or recess 192 in the outer tubing section 184a as to pass a valve ball 193 upon movement thereof between open and closed positions, as exemplified in FIGS. 4a and 5. Thus, in FIG. 4a, the ball is trapped in the side recess 192 by the oppositely tapering shoulders 194 and 195, shoulder 194 defining the upper side of opening 191, and shoulder 195 being formed on an auxiliary collet 196. The valve is therefore in open position, corresponding to down position of the inner tubing 173 and actuator 160. In this regard, the pressure receiving zone 167 in chamber or cylinder 163 is normally pressurized as by well pressure transmitted via line 197, valve 198, pilot valve 201 and port 168, so that the actuator piston has its upper and lower surfaces 199 and 200 exposed to well pressure. The sizing of the surfaces is such that under normal flow conditions the weight of the actuator and tubing 173 holds the valve in FIG. 4a position. An auxiliary pressure source includes pump 320, line 321 and valve 322.

At the time of an accident, or decline in pressure in the surface flow line 197, the pilot valve 201 will vent the upper zone 167 via pressure vent 202, and the well pressure communicated to lower zone 203 via space 172 will be effective to displace the actuator 161 and tubing 173 upwardly, to effect closing of the sub-surface valve to FIG. 5 position.

Referring again to FIG. 4a, as the insert 185 is lifted, the edge 205 of side opening 191 engages the ball only after the shoulder 194 has retreated upwardly away from the ball; thereafter, the edge 205 urges the ball upwardly against ramp 207 on outer tubing section 184a, whereby the ball is urged inwardly back into the flow passage 208 defined by the insert. Accordingly, the flow pressure lifts the ball against the seat 209 as seen in FIG. 5, to close the valve.

Collet 196 has spring fingers 210 and lugs 211 engageable in groove 212 formed by section 184a for retaining the collet in FIG. 4a position while the ball valve is operated between open and closed positions. When the insert is retrieved, the collet fingers are lifted by shoulder 213 of insert lower extension 310 and are cammed inwardly by shoulder 214, as seen in FIG. 5. Opening of the valve is effected by effecting downward fluid pressure application on the ball in FIG. 5, to cause the ball to travel down ramp 215 toward the side pocket, and also lowering the insert as by pressurizing the actuator surface 199, thereby to trap the ball in FIG. 4a position. Pressure exertion downward through the actuator and inner tubing 173 may be effected as by a pump described at 72 in FIG. 1.

Figure 4B:
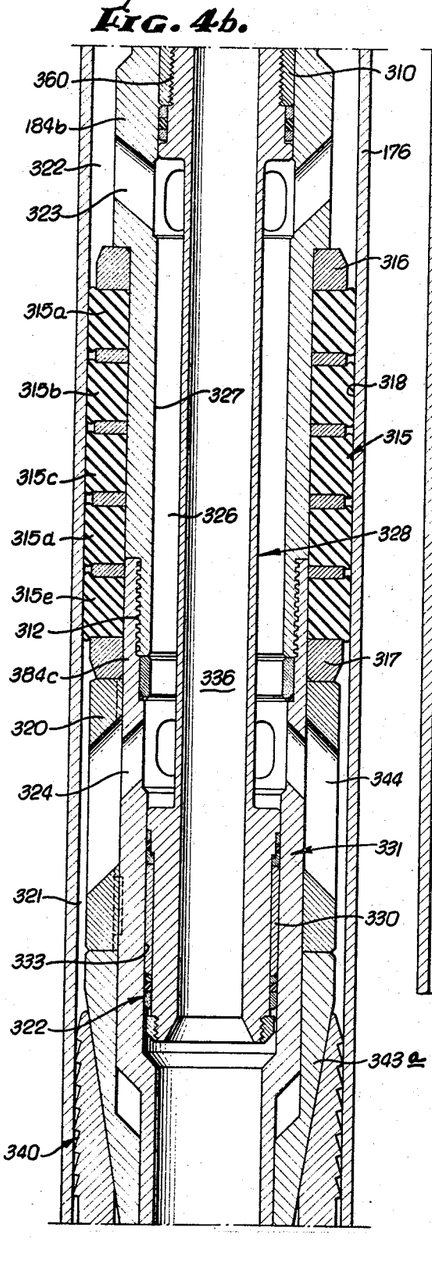
Figure 4C:
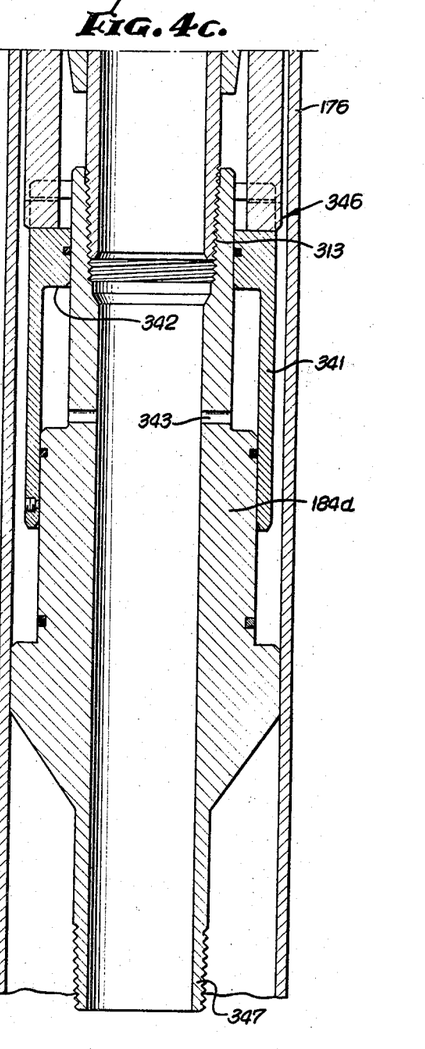

Referring to FIGS. 4a–4c, the outer tubing 184 may be considered to include tubular body section 184a–184d, having threaded interconnection in vertical sequence at 311–313. The outer tubing 184 carries packer apparatus generally indicated at 315 in FIG. 4b, the packer including endwise compressible ring elements 315a, 315b, 315c, 315d and 315e. These packer elements are in turn carried on body sections 184b and 184c between upper and lower compression rings 316 and 317. Packer elements 315a–315e are subject to expansion into sealing engagement with the casing bore at 318 in response to upward displacement of ring 317 relative to ring 316, as indicated. In this regard, actuator ring 317 may be urged upwardly by an actuator sleeve 320 slidably mounted on the body section 184c.

FIG. 4b shows the packer expanded to seal off the lower and upper annular zones 321 and 322 between the casing bore and the tubing 184. The latter has upper and lower side porting indicated at 323 and 324 to by-pass production fluid pressure around the packer for communication to the underside of the member 170, and if desired that fluid may be removed at the well head as via appropriate ducting and valving indicated at 325 in FIG. 4 as communicating with the interior of the casing 176. In such by-passing, the flow passes vertically through annular passage 326 formed between the bore 327 of body sections 184b and 184c, and the periphery of a sleeve valve 328 received within bore 327.

The sleeve valve may be characterized as carried by the tubing 173 for movement between a lower or first position in which communication between zones 321 and 322 is open (as shown) and an upper or second position in which such communication is closed. Such movement is communicated to the sleeve valve in response to vertical displacement of the actuator piston 161 and interior tubing 173 including portion 174, insert 185 and insert lower extension 310 connected to the sleeve valve at 360, so that the sleeve valve closes when the ball valve 193 closes against seat ring 209, and the sleeve valve opens when the ball valve moves to FIG. 4a open position. The sleeve valve includes a cylindrical closure 330 and endwise spaced annular seals 331 and 332 retained as shown so as to be movable endwise with the sleeve valve. The seals engage the bore 333 of body section 184c as the sleeve valve moves endwise. When closure 330 is in its up position, the flange 334 of the sleeve valve engages annular seal 335, whereby ports 324 are effectively closed off from interior passage 326.

It will be noted that the sleeve valve contains a central opening 336 to pass a stream of well fluid upwardly therethrough, for upward flow through the inner tubing, as controlled by valve 193. Also, the tubing 184 is supported on slips 340 that are urged outwardly to engage the casing bore in response to internal well fluid pressure communication via port 343 to slip actuator ring 341 at surface 342. As actuator ring 341 is elevated, it urges the annular cone member 343a upwardly by force transmitted via the slips; also, member 343a transmits force to ring 317 via the annular sleeve 320 which is ported at 344 opposite ports 324. The slips have the usual T-slot connection at 346 with body section 184d, and the latter is connectible with well tubing at threading 347.

Figure 9:
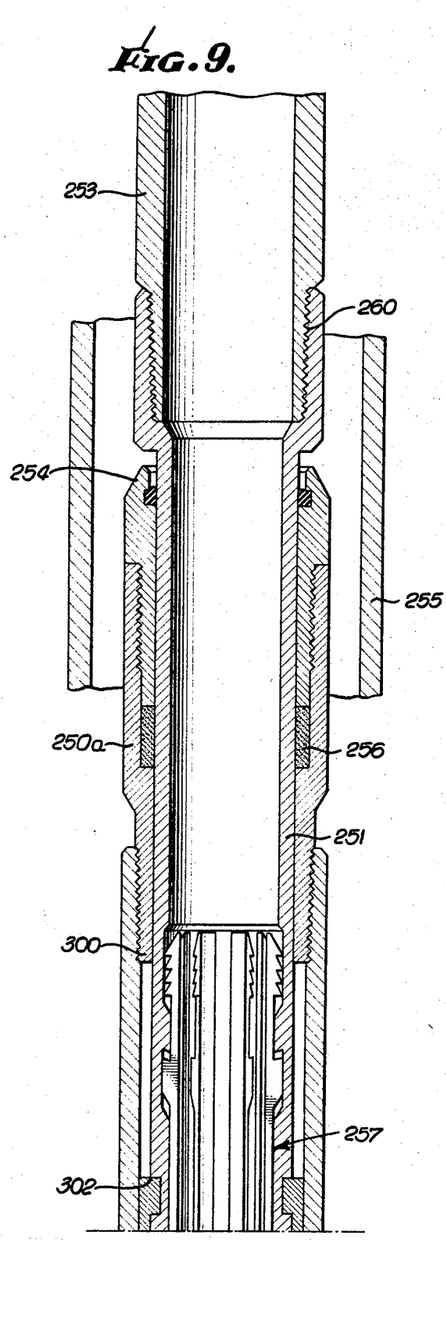
FIGS. 9 and 9a are enlarged vertical sections showing a further modified form of sub-surface valve, and in open position.
Figure 9A:
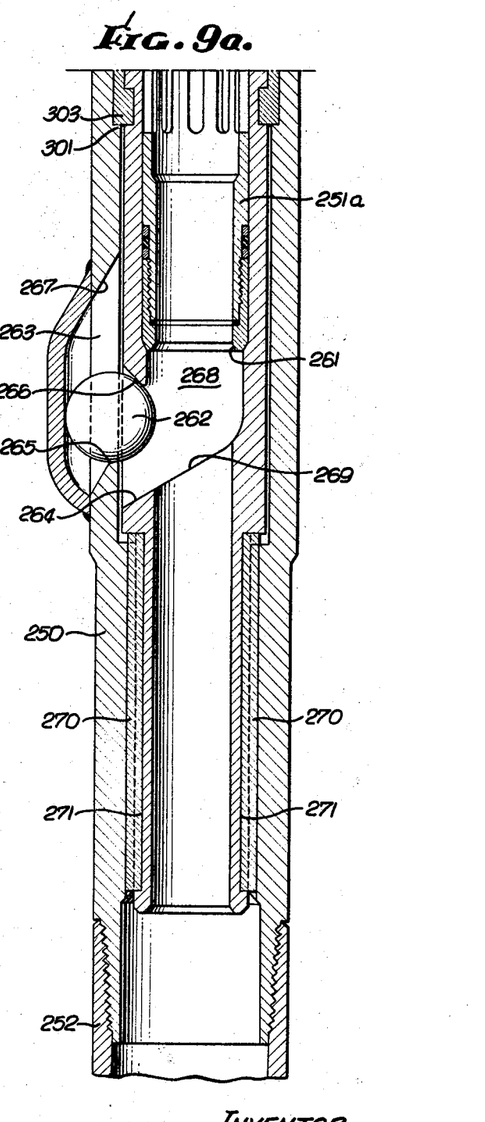

Turning now to FIGS. 9 and 9a, a tubular body 250 is supportable in the well to receive the tubular insert 251. Typically, the body 250 may be connected to lower tubing 252 supported as by slips seen at 13 in FIG. 1a. The flow tubing 253 that is vertically reciprocable by the surface actuator of the type seen in FIG. 1 projects fully above the upper terminal 254 of body 250, whereby the flow tubing comprises the main tubing string, eliminating need for an inner string confined within an outer string. The well casing appears at 255. Packing, as represented by the Teflon sealing element 256, seals off between body section 250a and the insert allowing vertical reciprocation of insert 251 relative to section 250a, the former being connected at 260 to the flow tubing.

Figures 10, 11, 12:
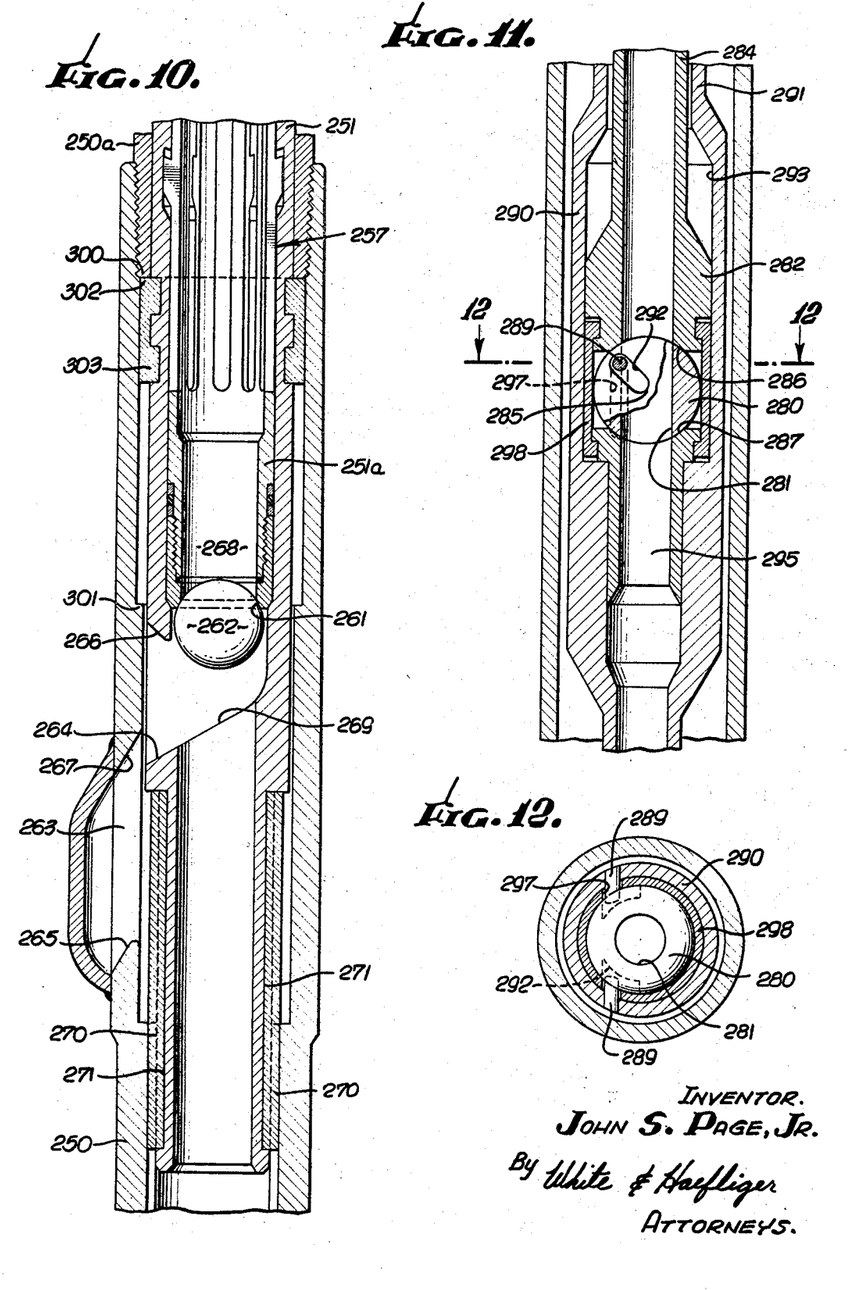
FIG. 10 is a view like FIG. 9a, but showing the valve in closed position.
FIG. 11 is a vertical section showing still another form of sub-surface valve operable from the surface as described.
FIG. 12 is a horizontal section taken on line 12—12 of FIG. 11.

A collet 257, similar to collet 106 in FIG. 2, supports the insert internal section 251a providing a seat at 261 for the valve ball 262. Body 250 has a side opening or packet 263 registerable with the insert side opening 264 to pass the ball valve upon movement thereof between open and closed positions as seen in FIGS. 9a and 10. In FIG. 9a the ball is trapped between body and insert shoulders 265 and 266 respectively. As the tubing 253 is elevated, the ball 262 is engaged by the shoulder defining the lower extent of the insert opening, and urged against ramp 267, which deflects the ball back into the flow passage 268. The flow pressure then elevates the ball to seal against the seat 261. To open the valve, fluid pressure is applied down tubing 253 to urge the ball downward against ramp 269, and the insert is lowered by the tubing 253 to register side openings 263 and 264 sufficiently to pass the ball to FIG. 9a position, where it is trapped. Keys and keyways 270 and 271 guide the vertical displacement of the insert so as to maintain side openings 263 and 264 in vertical alignment. Limits 300 and 301 engage insert shoulders 302 and 303 to establish extreme upper and lower position of the insert.

Referring to FIGS. 11 and 12, the modified valve has the form of a ball plug 280 containing a through passage 281. As the insert 282 is lifted by flow tubing 284 in the manner described in FIG. 1, the ball travels upwardly and also rotates about transverse axis 285, to rotate passage 281 ninety degrees, i.e. from open to closed positions, the ball engaging upper and lower annular slots 286 and 287. Transverse pins 289 carried by the enlarged body 290 of outer tubing string 291 project through vertical slots 297 in the insert sleeve 298 and into slots 292 in the ball to effect its rotation in response to vertical bodily displacement thereof. Body 290 has an enlarged bore at 293 to allow vertical displacement of the insert 282 relative to body 290 in response to vertical manipulation of flow tubing 284 effected by operation of the surface actuator. As before, the insert contains a flow passage 295 in vertical alignment with the passages in the tubing 284 and surface actuator.

I claim:

1. In combination, structure including a well fluid flow controlling valve adapted for installation and operation at a sub-surface locaton in a well, apparatus including a vertically reciprocable pressure responsive actuator adapted for installation and operation at the well head, and means including flow tubing adapted for installation and operation in the well and connected to be vertically displaced by the actuator for effecting displacement of the valve between open position in which well fluid is flowable vertically upwardly through the valve, tubing and actuator and to the well head, and closed position in which the valve structure blocks upward flow to the well head, said structure including an exterior seal adapted to seal off against an outer tubular body, said structure being carried by the flow tubing to be bodily retrievable upwardly through the installed flow tubing and the actuator.

2. The combination of claim 1 in which the tubing has a central flow passage which remains vertically open through the valve structure and actuator when the valve is in open position.

3. The combination of claim 1 in which said tubing and valve are displaceable between an up position in which the valve is open and a down position in which the valve is closed.

4. The combination of claim 1 in which the valve includes a plug having a passage therethrough, the plug being rotatable and displaceable vertically between closed position in which said passage is out of flow passing communication with said tubing and open position in which said passage is in flow passing communication with said tubing.

5. The combination of claim 1 in which said apparatus includes a chamber to receive the actuator at the well head, and means to apply fluid pressure to the actuator in said chamber so as to displace the actuator and tubing vertically.

6. The combination of claim 5 in which the actuator contains a vertical passage in communication with said tubing to pass well fluid flowing upwardly therethrough.

7. The combination of claim 6 including means to apply fluid pressure downwardly via said actuator passage and the flow tubing to the valve in closed position thereof so as to counteract upward pressure of well fluid thereagainst, thereby facilitating opening of the valve.

8. The combination of claim 5 in which said last named means includes pilot valving connected to receive well fluid pressure and to selectively communicate said pressure to opposite sides of the actuator.

9. The combination of claim 8 in which said pilot valving is connected to vent the pressure at that side of the actuator opposite that at which well fluid pressure is applied, and the valve is closable upon lowering of said tubing whereby if well fluid pressure applied to lift the actuator should drop sufficiently the actuator and tubing will drop thereby to effect closing of the valve.

10. In combination, structure including a well fluid flow controlling valve adapted for installation and operation at a sub-surface location in a well, apparatus including a vertically reciprocable pressure responsive actuator adapted for installation and operation at the well head, and means including flow tubing adapted for installation and operation in the well and connected to be vertically displaced by the actuator for effecting displacement of the valve between open position in which well fluid is flowable vertically upwardly through the valve, tubing and actuator and to the well head, and closed position in which the valve structure blocks upward flow to the well head, the tubing having a central flow passage which remains vertically open through the valve structure and actuator when the valve is in open position, the tubing having a vertical central axis, and the valve having a plug which in open position extends eccentrically with respect to the tubing axis.

11. In combination structure including a well fluid flow controlling valve adapted for installation and operation at a sub-surface location in a well, apparatus including a vertically reciprocable pressure responsive actuator adapted for installation and operation at the well head, and means including flow tubing adapted for installation and operation in the well and connected to be vertically displaced by the actuator for effecting displacement of the valve between open position in which well fluid is flowable vertically upwardly through the valve, tubing and actuator and to the well head, and closed position in which the valve structure blocks upward flow to the well head, said apparatus including a chamber to receive the actuator at the well head, means to apply fluid pressure to the actuator in said chamber so as to displace the actuator and tubing vertically, and outer tubing adapted for installation in the well to extend below said chamber and receive said flow tubing proximate the valve, said outer tubing containing a side opening to receive the valve upon opening thereof.

12. The combination of claim 11 including means to support said outer tubing in the well.

13. The combination of claim 11 in which the outer tubing communicates with the actuator to pass well fluid pressure thereto tending to urge the actuator in a direction acting to close the valve.

14. The combination of claim 13 including means to apply fluid pressure to the actuator tending to urge the actuator in a direction acting to open the valve.

15. The combination of claim 11 in which said structure includes a tubular insert having a side opening movable vertically with the flow tubing and in such relation with the outer tubing side opening as to pass the valve upon movement thereof between open and closed positions.

16. The combination of claim 15 in which the valve comprises a ball, the insert has a ramp angled to guide the ball to drop laterally outwardly toward open position via the outer tubing side opening, and the outer tubing has a ramp angled to guide the ball to drop laterally inwardly from the outer tubing side opening toward the insert side opening upon sufficient lowering of said insert side opening relative to the outer tubing side opening.

17. The combination of claim 15 including a tubular body connectible in series with the outer tubing, a packer carried to pack off between said body and a well bore, and means for altering communication between well zones at lower and upper sides of the packer and outside said body in response to vertical movement of said insert.

18. In combination, structure including a well fluid flow controlling valve adapted for installation and operation at a sub-surface location in a well, apparatus including a vertically reciprocable pressure responsive actuator adapted for installation and operation at the well head, and means including flow tubing adapted for installation and operation in the well and connected to be vertically displaced by the actuator for effecting displacement of the valve between open position in which well fluid is flowable vertically upwardly through the valve, tubing and actuator and to the well head, and closed position in which the valve structure blocks upward flow to the well head, said apparatus including a chamber to receive the actuator at the well head, means to apply fluid pressure to the actuator in said chamber so as to displace the actuator and tubing vertically, and said structure including a tubular insert carrying the valve, and a collet releasably supporting the insert within the flow tubing, said structure being sized for upward retrieval through the flow tubing upon release of the collet.

19. In combination, structure including a well fluid flow controlling valve adapted for installation and operation at a sub-surface location in a well, apparatus including a vertically reciprocable pressure responsive actuator adapted for installation and operation at the well head, and means including flow tubing adapted for installation and operation in the well and connected to be vertically displaced by the actuator for effecting displacement of the valve between open position in which well fluid is flowable vertically upwardly through the valve, tubing and actuator and to the well head, and closed position in which the valve structure blocks upward flow to the well head, said apparatus including a chamber to receive the actuator at the well head, means to apply fluid pressure to the actuator in said chamber so as to displace the actuator and tubing vertically, and said structure including a tubular insert having a side opening, a tubular body supportable in the well to receive said insert, said flow tubing projecting above the upper terminal of said body and adapted to displace said insert vertically, said body having a side opening registerable with said insert side opening to pass the valve upon movement thereof between open and closed positions, and means to seal off between said body and said insert.

20. In combination with flow tubing adapted for installation in a well, structure including a well fluid flow controlling valve adapted for installation and operation at a sub-surface location in a well, and apparatus including a vertically reciprocable pressure responsive actuator adapted for installation and operation at the well head, the actuator and said structure being operatively connectible through said tubing whereby vertical displacement of the actuator effects displacement of the valve between open position in which well fluid is flowable upwardly through the tubing to the well head, and closed position in which the valve structure blocks upward flow to the well head, a tubular outer string supportable in a well and receiving said flow tubing and structure, said structure including an exterior seal sealing off against the interior of said outer string, and said structure being carried by the flow tubing to be bodily retrievable upwardly through the flow tubing and the actuator.

21. The combination of claim 20 in which the actuator contains a vertical passage to communicate with the tubing for passing well fluid flowing upwardly therethrough.

22. The combination of claim 21, including a tubular body adapted to be positioned in a well below said valve, a packer carried to pack off between said body and a well bore, and sleeve valve means for altering communication between well zones at lower and upper sides of the packer and outside said body in response to vertical movement of said tubing.

References Cited

UNITED STATES PATENTS

| | | | |
|---|---|---|---|
| 2,499,356 | 3/1950 | Coberly | 166—72 |
| 2,831,539 | 4/1958 | En Dean et al. | 166—73 |
| 3,156,300 | 11/1964 | Page et al. | 166—72 X |
| 3,269,463 | 8/1966 | Page | 166—153 X |
| 3,299,955 | 1/1967 | Page | 166—48 |
| 3,313,350 | 4/1967 | Page | 166—72 X |
| 3,351,133 | 11/1967 | Clark et al. | 166—72 X |

DAVID H. BROWN, *Primary Examiner.*